(12) United States Patent
Shiomi

(10) Patent No.: US 6,799,325 B1
(45) Date of Patent: Sep. 28, 2004

(54) TELEVISION RECEIVER EMPLOYING V CHIP SYSTEM AND METHOD OF DISPLAYING RATING INFORMATION IN TELEVISION RECEIVER EMPLOYING V CHIP SYSTEM

(75) Inventor: Yoshiharu Shiomi, Daito (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/422,855

(22) Filed: Oct. 25, 1999

(30) Foreign Application Priority Data

Oct. 27, 1998 (JP) .......................... 10-305932

(51) Int. Cl.⁷ .................. H04N 7/16; H04N 5/445; H04N 5/50; G06F 3/00; G06F 13/00

(52) U.S. Cl. .................. 725/25; 725/27; 725/28; 725/40; 725/41; 725/43; 725/44; 725/45; 725/53; 725/56; 348/564; 348/569

(58) Field of Search .................. 725/25, 27, 28, 725/40, 41, 43, 53, 56, 44, 45; 348/564, 569

(56) References Cited

U.S. PATENT DOCUMENTS

| | | | | |
|---|---|---|---|---|
| 5,635,978 A | * | 6/1997 | Alten et al. ................ | 348/569 |
| 6,005,565 A | * | 12/1999 | Legall et al. ................ | 345/721 |
| 6,034,677 A | * | 3/2000 | Noguchi et al. ............. | 345/719 |
| 6,216,263 B1 | * | 4/2001 | Elam .......................... | 725/151 |
| 6,243,142 B1 | * | 6/2001 | Mugura et al. .............. | 348/564 |
| 6,295,646 B1 | * | 9/2001 | Goldschmidt Iki et al. . | 348/564 |
| 6,426,779 B1 | * | 7/2002 | Noguchi et al. ............. | 348/569 |

FOREIGN PATENT DOCUMENTS

| | | |
|---|---|---|
| JP | 05 284476 A | 10/1993 |
| JP | 08 116495 A | 5/1996 |
| JP | 08 251121 A | 9/1996 |
| JP | 10 108090 | 4/1998 |
| JP | 10 108149 A | 4/1998 |

OTHER PUBLICATIONS

Notice of Rejection Dated Mar. 18, 2003 for corresponding Japanese Patent Appln. JP 10-305932.

* cited by examiner

*Primary Examiner*—John Miller
*Assistant Examiner*—Michael W. Hoye
(74) *Attorney, Agent, or Firm*—Armstrong, Kratz, Quintos, Hanson & Brooks, LLP

(57) ABSTRACT

A method of displaying rating information comprises the step of tuning in to a designated channel when a program selecting operation is performed and acquiring rating information, and the step of displaying the acquired rating information, together with a program image obtained by the tuning, on a display device.

2 Claims, 4 Drawing Sheets

| C 04 | C 06 | C 10 | C 14 | C 15 |
|---|---|---|---|---|
| TV-M | TV-G | NA | NA | TV14D |
| C 20 | C 24 | C 26 | C 30 | C 35 |
| TVY7 | TV14S | TVPGL | NA | TVMA |
| C 40 | C 44 | C 48 | C 52 | C 55 |
| TV-M | TV-G | NA | NA | TV14D |
| C 60 | C 75 | C 78 | C 82 | C 84 |
| TVY7 | TV14S | TVPGL | NA | TVMA |
| C 88 | C 92 | C 94 | C 98 | C 100 |
| TV-M | TV-G | NA | NA | TV14D |
| C 102 | C 106 | C 110 | C 115 | C 120 |
| TVY7 | TV14S | TVPGL | NA | TVMA |

FIG. 2

| | | | | |
|---|---|---|---|---|
| C 04<br>TV-M | C 06<br>TV-G | C 10<br>NA | C 14<br>NA | C 15<br>TV14D |
| C 20<br>TVY7 | C 24<br>TV14S | C 26<br>TVPGL | C 30<br>NA | C 35<br>TVMA |
| C 40<br>TV-M | C 44<br>TV-G | C 48<br>NA | C 52<br>NA | C 55<br>TV14D |
| C 60<br>TVY7 | C 75<br>TV14S | C 78<br>TVPGL | C 82<br>NA | C 84<br>TVMA |
| C 88<br>TV-M | C 92<br>TV-G | C 94<br>NA | C 98<br>NA | C 100<br>TV14D |
| C 102<br>TVY7 | C 106<br>TV14S | C 110<br>TVPGL | C 115<br>NA | C 120<br>TVMA |

TELEVISION RECEIVER EMPLOYING V CHIP SYSTEM AND METHOD OF DISPLAYING RATING INFORMATION IN TELEVISION RECEIVER EMPLOYING V CHIP SYSTEM

BACKGROUND OF THE INVENTION

1. Field of the Invention

The present invention relates to a television receiver employing a V chip system and a method of displaying rating information in the television receiver employing the V chip system.

2. Description of the Prior Art

In the United States, a V chip system has been introduced in order to automatically make it impossible to view programs which parents do not desire their children to view. Also in Japan, the introduction of the V chip system is being examined.

In the V chip system, ratings such as "violent" and "sexual" are respectively given to television programs, and the program to be broadcast as well as rating information relating to the program to be broadcast is sent out. Currently, the rating information is sent out utilizing a vertical blanking period of a video signal. On the other hand, a V chip for identifying ratings is incorporated into a television receiver, to automatically make it impossible to view programs respectively having ratings designated by the parents.

That is, the television receiver employing the V chip system is provided with means for identifying a rating on the basis of rating information sent with a program accompanied by the rating information, means for causing parents to set such a rating that a program having the rating is to be inhibited from being viewed by their children, and means for inhibiting the program having the rating set by the parents from being broadcast in addition to a normal television receiver.

In the television receiver employing the V chip system, it is convenient to allow a user to know a rating for a selected program. Further, it is convenient to allow the user to collectively know ratings for programs currently being broadcast, respectively, on channels because the user can select the program also in consideration of the rating.

SUMMARY OF THE INVENTION

An object of the present invention is to provide a television receiver employing a V chip system in which a user can know a rating for a selected program, and a method of displaying rating information in the television receiver employing a V chip system.

Another object of the present invention is to provide a television receiver employing a V chip system in which a user can collectively know ratings for programs currently being broadcast, respectively, on channels, and a method of displaying rating information in the television receiver employing a V chip system.

A method of displaying rating information in a first television receiver employing a V chip system according to the present invention is characterized by comprising the steps of tuning in to a designated channel when a program selecting operation is performed, and acquiring rating information; and displaying the acquired rating information, together with a program image obtained by the tuning, on a display device.

A method of displaying rating information in a second television receiver employing a V chip system according to the present invention is characterized by comprising the steps of causing a user to enter a rating list display command; successively tuning in to receivable channels when the rating list display command is entered, acquiring rating information relating to a program currently being broadcast on each of the receivable channels, and storing the rating information for each of the channels in a storage device; and displaying, after the acquisition of the rating information for all the receivable channels is terminated, a rating list screen comprising each of the receivable channels and a rating for the program currently being broadcast on the channel on a display device.

A first television receiver employing a V-chip system according to the present invention is characterized by comprising means for tuning in to a designated channel when a program selecting operation is performed, and acquiring rating information; and means for displaying the acquired rating information, together with a program image obtained by the tuning, on a display device.

A second television receiver employing a V chip system according to the present invention is characterized by comprising means for causing a user to enter a rating list display command; means for successively tuning in to receivable channels when the rating list display command is entered, acquiring rating information relating to a program currently being broadcast on each of the receivable channels, and storing the rating information for each of the channels in a storage device; and means for displaying on a display device, after the acquisition of the rating information for all the receivable channels is terminated, a rating list screen comprising each of the receivable channels and a rating for the program currently being broadcast on the channel.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a schematic view showing an example of a rating list screen;

DETAILED DESCRIPTION OF THE PREFERRED EMBODIMENTS

Figure 1:
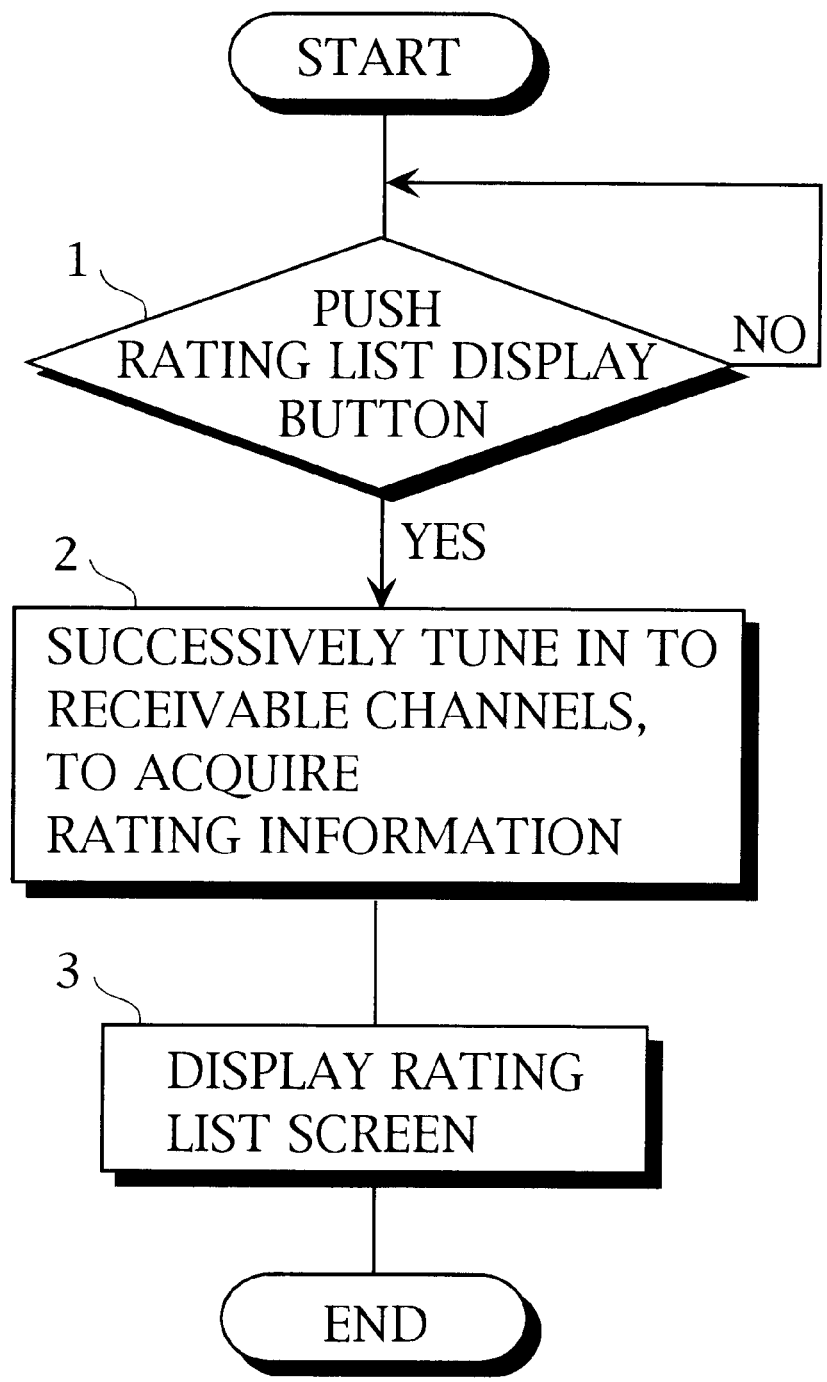
FIG. 1 is a flow chart showing the procedure for processing performed by a system controller in a television receiver when a rating list display button is operated.

Referring now to the drawings, an embodiment of the present invention will be described.

A television receiver employing a V chip system according to the present embodiment comprises the function of displaying a list of ratings for programs currently being broadcast, respectively, on channels and the function of displaying a rating for the selected program.

[1] Description of the Function of Displaying a List of Ratings for Programs Currently being Broadcast, Respectively, on Channels Receivable channels shall be stored in a non-volatile memory. A rating list display button is provided in a remote controller.

FIG. 1 shows the procedure for processing performed by a system controller in the television receiver when the rating list display button is operated.

When the rating list display button is pushed (step 1), the receivable channels stored in the non-volatile memory are successively tuned in to, to acquire rating information relating to a program currently being broadcast on each of the receivable channels, and store the rating information for each of the channels in the non-volatile memory (step 2).

When the acquisition of the ratings for all the receivable channels is terminated, a rating list screen comprising each of the receivable channels and the rating for the program currently being broadcast on the channel is displayed (step 3).

An example of the rating list screen is illustrated in FIG. 2. In FIG. 2, "C 04", "C 06", . . . "C 120" respectively indicate channel numbers. "TV-M", "TV-G", . . . "TVMA" respectively displayed under the channel numbers indicate ratings defined by an MPAA (Motion Pictures Association of America) system and a TVPG (TV Parental Guidance) system which are defined by EIA (Electronic Industries Association)-744.

A user can know the rating for the program currently being broadcast on each of the receivable channels by the list of ratings. Accordingly, each of the programs can be selected in consideration of the rating for the program.

In order to erase the rating list screen, the rating list display button may be pushed again, for example.

When "Rating List Display" is provided as a selection item on the menu screen, and the selection item "Rating List Display" is selected, the processing at the foregoing step 2 and the subsequent steps may be performed.

[2] Description of the Function of Displaying a Rating for a Selected Program

Figure 3:
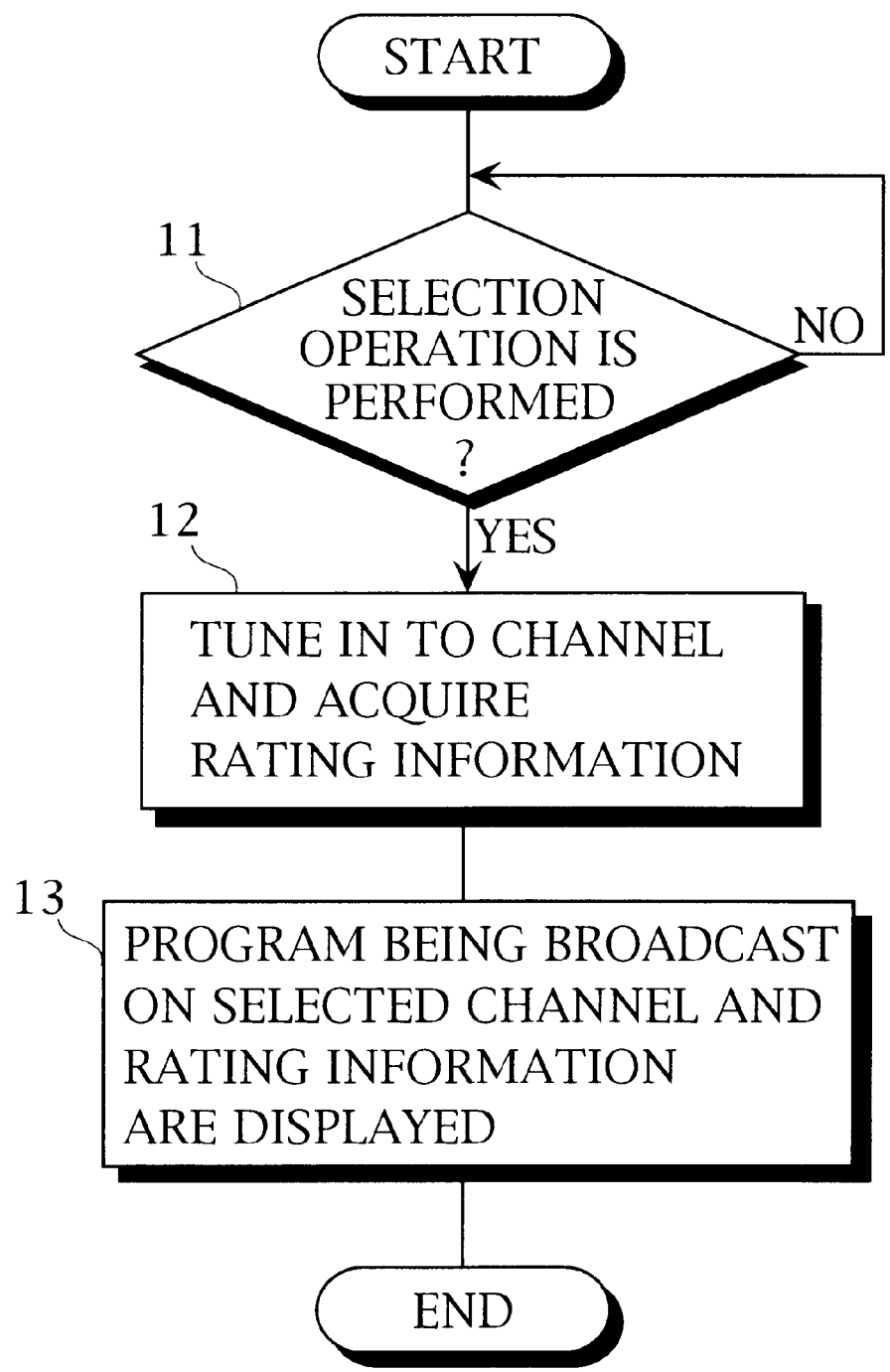
FIG. 3 is a flow chart showing the procedure for processing performed by the system controller in the television receiver when a selecting operation is performed by a user.

FIG. 3 shows the procedure for processing performed by the system controller in the television receiver when a selection operation is performed by a user.

When the selection operation is performed (step 11), a designated channel is tuned in to, and rating information is acquired (step 12).

Figure 4:
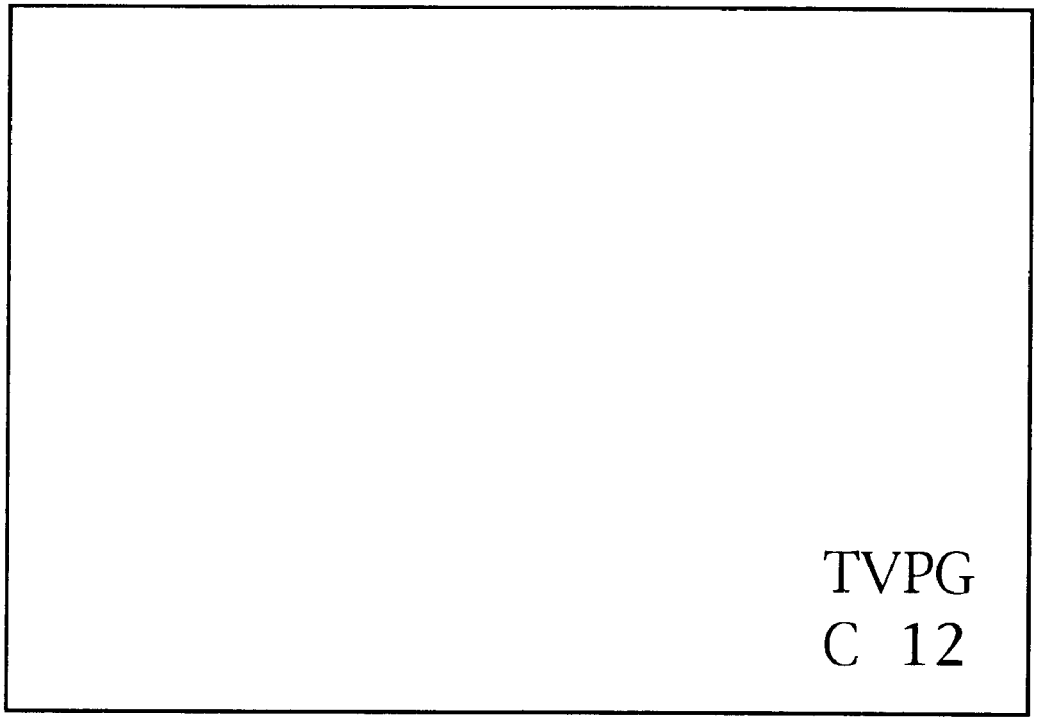
FIG. 4 is a schematic view showing an example of a display screen at the time of selecting a program.

As shown in FIG. 4, a program currently being broadcast on the selected channel is displayed, and the acquired rating information is displayed (step 13).

In an example shown in FIG. 4, a rating "TVPG" and a channel number "C12" are displayed at the lower right of a screen. The display of the rating information and the channel number can be erased by a display on-off button provided in the remove controller, for example.

Since the user can know the rating for the selected program, it can be judged depending on circumferences whether or not the program may be viewed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of displaying rating information in a television receiver employing a V chip system, comprising the steps of:

causing a user to enter a rating list display command;

successively tuning in to receivable channels when the rating list display command is entered, acquiring rating information relating to a program currently being broadcast on each of the receivable channels by a V-chip function, and storing the rating information for each of the channels in a storage device; and displaying on a display device, after the acquisition of the rating information from the V-chip function for all the receivable channels is terminated, a rating list screen comprising each of the receivable channels and a rating for the program currently being broadcast on the channel received from the V-chip function, wherein the V-chip function scans all the channels currently being broadcast and extracts the rating information for each channel, the rating information for each channel is stored and all broadcast channels along with their individual rating information are displayed.

2. A television receiving employing a V chip system, comprising:

means for causing a user to enter a rating list display command;

means for successively tuning in to receivable channels when the rating list display command is entered, acquiring rating information relating to a program currently being broadcast on each of the receivable channels by a V-chip function, and storing the rating information for each of the channels in a storage device; and means for displaying, after the acquisition of the rating information received from the V-chip function for all the receivable channels is terminated, a rating list screen comprising each of the receivable channels and a rating for the program currently being broadcast on the channel received from a V-chip function on a display device wherein the V-chip function scans all the channels currently being broadcast and extracts the rating information for each channel, the rating information for each channel is stored and all broadcast channels along with their individual rating information are displayed.

* * * * *